Nov. 13, 1962 G. R. EK 3,064,197

AUTOMATIC NOISE LIMITER CIRCUIT

Filed Sept. 20, 1960 2 Sheets-Sheet 1

INVENTOR.
GAYNE R. EK
BY Moody and Harris
ATTORNEYS

FIG 4 (a) (b) (c) (d)

INVENTOR.
GAYNE R. EK
BY Moody and Harris
ATTORNEYS

United States Patent Office 3,064,197
Patented Nov. 13, 1962

3,064,197
AUTOMATIC NOISE LIMITER CIRCUIT
Gayne R. Ek, Cedar Rapids, Iowa, assignor to Collins Radio Company, Cedar Rapids, Iowa, a corporation of Iowa
Filed Sept. 20, 1960, Ser. No. 57,287
3 Claims. (Cl. 325—474)

This invention relates to an automatic noise limiting circuit and more particularly to a circuit for automatically substantially eliminating all noise pulses received from the second detector of an amplitude-modulation receiver.

Many types of noise limiting circuits have heretofore been utilized to clip noise pulses (which are usually of large amplitude and short duration), and it is the purpose of this invention to provide a relatively simple automatic noise limiting circuit which constitutes an improvement over those now known or utilized. It is also the purpose of this invention to provide an automatic noise limiting circuit which, unlike its predecessors, is not only capable of limiting noise pulses irrespective of modulation amplitude, but, can, in addition, substantially eliminate all noise that may be superposed on an amplitude-modulated signal coupled to said circuit.

It is therefore one object of this invention to provide a simple, yet reliable, circuit that is capable of automatically limiting noise pulses regardless of modulation amplitude.

More specifically, it is one object of this invention to provide a noise limiting circuit which utilizes both the audio signal and the direct voltage developed at the output of an amplifier to clip those portions of all noise pulses exceeding the amplitude of the peaks of said audio signal.

It is another object of this invention to provide an automatic noise limiting circuit which not only clips noise pulses but, in addition, provides means for substantially eliminating all noise at the output of said circuit.

More specifically, it is an object of this invention to provide a noise limiting circuit which includes means for clipping noise pulses at a level just above the peaks of an audio signal and inverting the same, and means for combining said inverted noise pulses with the same pulses not inverted to thereby substantially eliminate noise at the output of said circuit.

It is still another object of this invention to provide an automatic noise limiting circuit that is capable of also acting as a squelch circuit.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the embodiment of the invention constructed according to the best mode so far devised for the practical application of the principles thereof, and in which:

FIGURE 4 illustrates the effect on noise pulses at various stages of this invention.

Figure 1:
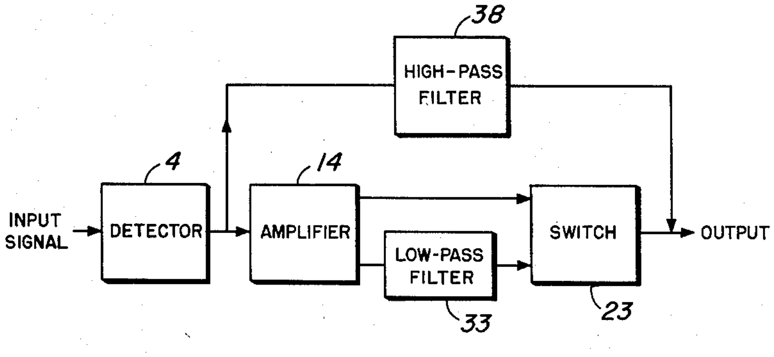
FIGURE 1 is a block diagram illustrating generally the automatic noise limiting circuit of this invention.
Figure 2:
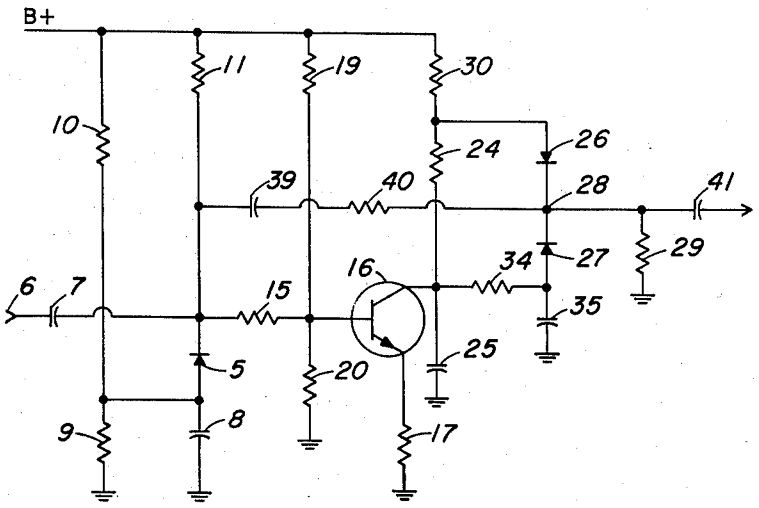
FIGURE 2 is a schematic presentation of a preferred embodiment of the automatic noise limiting circuit of this invention.

Referring now to the drawings, in which like numerals have been used for like characters throughout, the numeral 4 indicates generally a conventional detector which, for example, may be the second detector of an AM receiver. As shown in FIGURE 2, this detector may be of the shunt type and may include a diode 5, the cathode of which is connected to input terminal 6 through blocking capacitor 7, and the anode of which is connected to ground by means of a capacitor 8 and a resistor 9 connected in parallel. To provide bias for the detector, the anode of diode 5 may be connected to a source of B+ voltage by means of a resistor 10, while the cathode may be connected to the source of B+ voltage by means of a comparatively large blocking resistor 11.

The output from detector 4 may be coupled to amplifier 14 through resistor 15. Amplifier 14 preferably comprises a transistor 16 of the NPN type having its base connected to resistor 15 and its emitter connected to ground through resistor 17. Bias for transistor 16 may be provided by connecting the base to the junction between serially connected resistors 19 and 20, which, in turn, are connected between the source of B+ voltage and ground. While shown and described herein as a transistor of the NPN type, it is to be realized, of course, that other amplifying and signal inverting means might be used if desired, for example, a transistor of the PNP type or a vacuum tube, with only slight modification of circuitry obvious to one skilled in the art. It is felt, however, that a transistor is preferable to a vacuum tube, due, at least in part, to the low dynamic range of the collector which reduces the possible peak amplitude of the noise pulses, thereby easing the requirements of diode switch 23.

The audio signal is coupled from amplifier 14 to switch 23 by means of resistor 24. In addition, an R.F. bypass capacitor 25 may be provided between the collector of transistor 16 and ground, if desired. Switch 23 is preferably an "or" switch comprising diodes 26 and 27 having their cathodes connected as at 28. In addition, a path to ground is provided through resistor 29 connected to junction 28. The anode of diode 26 may also be connected to the B+ voltage source through resistor 30. It is to be realized, of course, that with minor modifications in circuitry an "and" switch might also be used in lieu of the switch shown and described herein.

To provide clipping of the noise pulses, the direct voltage developed at the collector of transistor 16 is also coupled to switch 23 through low pass filter 33, which filter may consist of a resistor 34, connected between the anode of diode 27 and the collector of transistor 16, and a capacitor 35, connected between the anode of diode 27 and ground.

Figure 3:
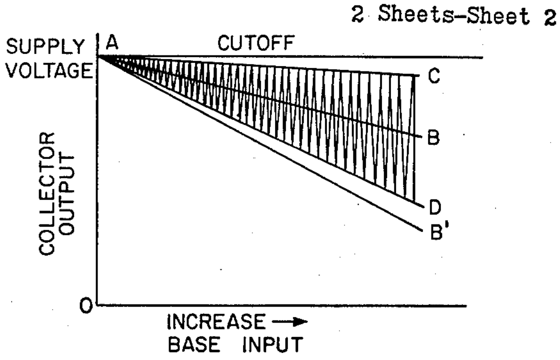
FIGURE 3 is a graphic illustration of the input-output relationship of the amplifier shown in FIGURE 2.
Figure 3:
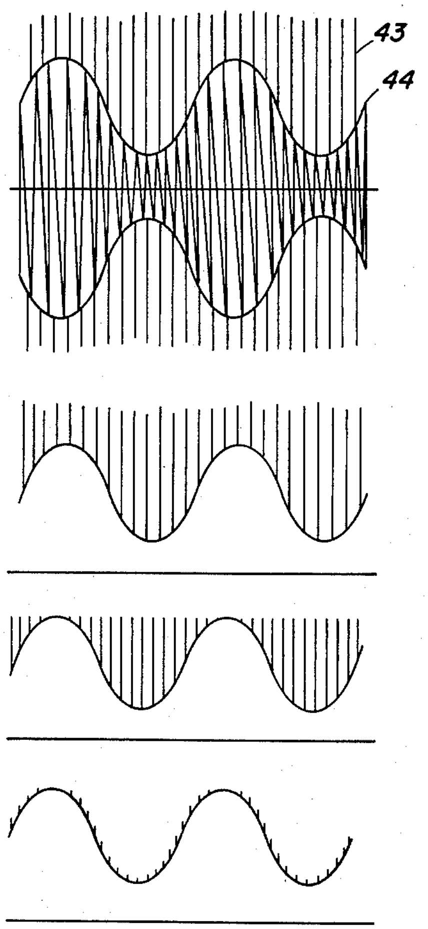

The direct voltage coupled from the collector of transistor 16 is inversely proportional to the base bias and this is, in turn, affected by the amplitude of the incoming R.F. carrier. In addition, the audio peak-to-peak signal and the bias level are directly proportional to the R.F. signal strength. Therefore, any change in the strength of the carrier will also affect the collector voltage as well as the audio signal amplitude, as represented in FIGURE 3 which illustrates this amplifier input-output relationship. Hence by selecting components such that the average collector voltage (B′) corresponds to the minimum voltage audio peaks at the output of the amplifier (D) the output from filter 33 provides a reference voltage for clipping noise pulses exceeding said peaks. In addition, some noise that is negative at the input (and hence ordinarily clipped by the detector) may remain after a strong burst, and this noise will also be clipped if the maximum voltage audio peaks (C) are very near cutoff.

It is another important feature of this invention that a high pass filter 38, which as shown in FIGURE 2 may comprise a capacitor 39 and a resistor 40 connected in series, is connected between detector 4 and the output of switch 23 for passing only noise pulses from the detector to switch 23. These noise pulses are, of course, opposite in phase with respect to these same noise pulses coupled to the switch from amplifier 14, since the signal is inverted in passing through said amplifier. By choosing components so that the noise pulses coupled to the output of switch 23 will be approximately equal to the clipped noise pulses present in the switch from amplifier 14, cancellation will occur and the output from switch 23 will be substantially free of noise. The output from switch 23 may then be coupled from the circuit through capacitor 41.

In operation, detector 4 may receive an amplitude-modulated signal which, as shown in FIGURE 4(*a*), has noise pulses 43 superposed thereon which exceed amplitude-modulation envelope 44. The received signal will be positively detected in conventional manner by detector 4 as shown in simplified FIGURE 4(*b*). In addition, this output may, if desired, be biased such as, for example, at one-half carrier peak-to-peak amplitude, as shown in FIGURE 4(*b*).

Assuming first that high pass filter 38 is not in the circuit, the noise pulses superposed on the audio signal coupled to switch 23 through amplifier 14 will be clipped just above the audio peaks for a given modulation amplitude, as shown by FIGURE 4(*c*). This is due to the presence in switch 23 of the reference direct voltage from the collector of transistor 16. Since the audio signal is coupled to diode 26 and the reference voltage to diode 27, current will flow from the more positive input to ground through resistor 29 and therefore connect that input to the output, the lower potential input being effectively disconnected from the output because of the back bias of its diode. Thus, by selecting components such that the reference voltage just exceeds the peaks of the audio signal, as shown in FIGURE 3, an audio signal without noise pulses exceeding this amplitude will be coupled through switch 23, while the switch will open and clip all noise pulses above this amplitude. By using the direct voltage of the collector as a reference voltage, clipping is independent of the modulation amplitude since it is determined by the signal strength of the incoming carrier received by detector 4.

With high pass filter 38 connected to junction 28, the noise pulses may be substantially eliminated. This is due to the fact that the noise pulses coupled from the output of detector 4 are inverted with respect to the same noise pulses coupled to switch 23 through amplifier 14, and hence cancel in switch 23. By choosing filter 38 such that the amplitude of the noise pulses are approximately equal to the amplified and clipped noise pulses from amplifier 14, this cancellation will substantially eliminate all noise pulses at the output of the circuit, as shown in FIGURE 4(*d*).

With no R.F. signal at the input, it is yet another feature of this invention that it operates in a carrier-type squelch, since the clipping level (which depends upon the strength of the carrier) is essentially zero.

An embodiment of this invention found to be best for clipping at 50% modulation with a supply voltage of 22 volts and a signal input of between 0 and 1.5 volts is as follows:

| Component | Identification Number | Size or Type |
|---|---|---|
| Diode | 5 | 1N457. |
| Capacitor | 7 | 510 μμ F. |
| Do | 8 | 0.1 μ f. |
| Resistor | 9 | 1,800 ohms. |
| Do | 10 | 18K ohms. |
| Do | 11 | 680K ohms. |
| Do | 15 | 33K ohms. |
| Transistor (NPN) | 16 | 2N338. |
| Resistor | 17 | 180 ohms. |
| Do | 19 | 330K ohms. |
| Do | 20 | 3,900 ohms. |
| Do | 24 | 560 ohms. |
| Capacitor | 25 | 100 μμf. |
| Diode | 26 | 1N457. |
| Do | 27 | 1N457. |
| Resistor | 29 | 330K ohms. |
| Do | 30 | 4,700 ohms. |
| Do | 34 | 470K ohms. |
| Capacitor | 35 | 0.1 μf. |
| Do | 39 | 1,000 μμf. |
| Resistor | 40 | 33K. |
| Capacitor | 41 | 1 μf. |

It is to be appreciated, of course, that the foregoing is merely a typical example of components which may be utilized to provide a workable embodiment of this invention.

From the foregoing description taken together with the accompanying drawings, it should be readily apparent to those skilled in the art that this invention provides an improved automatic noise limiting circuit which substantially eliminates all noise at the output of said circuit.

What is claimed as my invention is:

1. A signal coupling and automatic noise limiting circuit, comprising: detector means for receiving an amplitude-modulated signal which may include noise pulses; signal inverting means connected to said detector means for receiving a detected audio signal therefrom; switching means having a pair of input terminals and an output terminal; means connecting one of said input terminals with said signal inverting means for coupling said audio signal to said switching means; means connecting said signal inverting means and the other of said input terminals for providing a direct voltage at said other input terminal to said switching means that is dependent upon the strength of the received amplitude modulated signal, whereby noise pulses in said audio signal are automatically clipped at a predetermined amplitude at least equal to the peaks of said audio signal; and filter means connected directly to said detector means and to the output terminal of said switching means for coupling noise pulses to said switching means to thereby substantially cancel the noise pulses in said audio signal and thereby substantially eliminate noise at the output of said circuit.

2. The signal coupling and automatic noise limiting circuit of claim 1 wherein said signal inverting means comprises a transistor having its base connected to said detector means and its collector connected to said switching means.

3. A signal coupling and automatic noise limiting circuit, comprising: detector means for receiving an amplitude-modulated signal which may include noise pulses; a transistor having its base connected to said detector means for receiving detected audio signals therefrom; switching means comprising in series a first input terminal, a first diode, an output terminal, a second diode connected directly in opposition to said first diode, and a second input terminal; means connecting the collector of said transistor to said first input terminal for coupling said audio signal to said switching means; means including a low pass filter connecting the collector of said transistor to said second input terminal of said switching means for coupling direct voltage from said collector substantially corresponding to the peaks of said audio signal, whereby that portion of noise pulses exceeding said peaks is eliminated; and high pass filter means for coupling noise pulses from the output of said detector to the output terminal of said switching means, said noise pulses being substantially equal in amplitude to the clipped noise pulses in said switching means coupled from said transistor to thereby substantially eliminate noise at the output of said circuit.

References Cited in the file of this patent

UNITED STATES PATENTS

| | | |
|---|---|---|
| 1,863,895 | Bishop | June 21, 1932 |
| 2,418,389 | Andresen | Apr. 1, 1947 |
| 2,422,976 | Nicholson | June 24, 1947 |
| 2,961,532 | Rowley | Nov. 22, 1960 |

OTHER REFERENCES

Rogers: "Suppressing Impulse Noise," Wireless World, December 1949, pages 489 to 492.